3 Sheets
Sheet 1.
3 Sheets.
J. S & D. Lake.
Mower.
No 12
No 1117
Reissued Jan. 1, 1861.
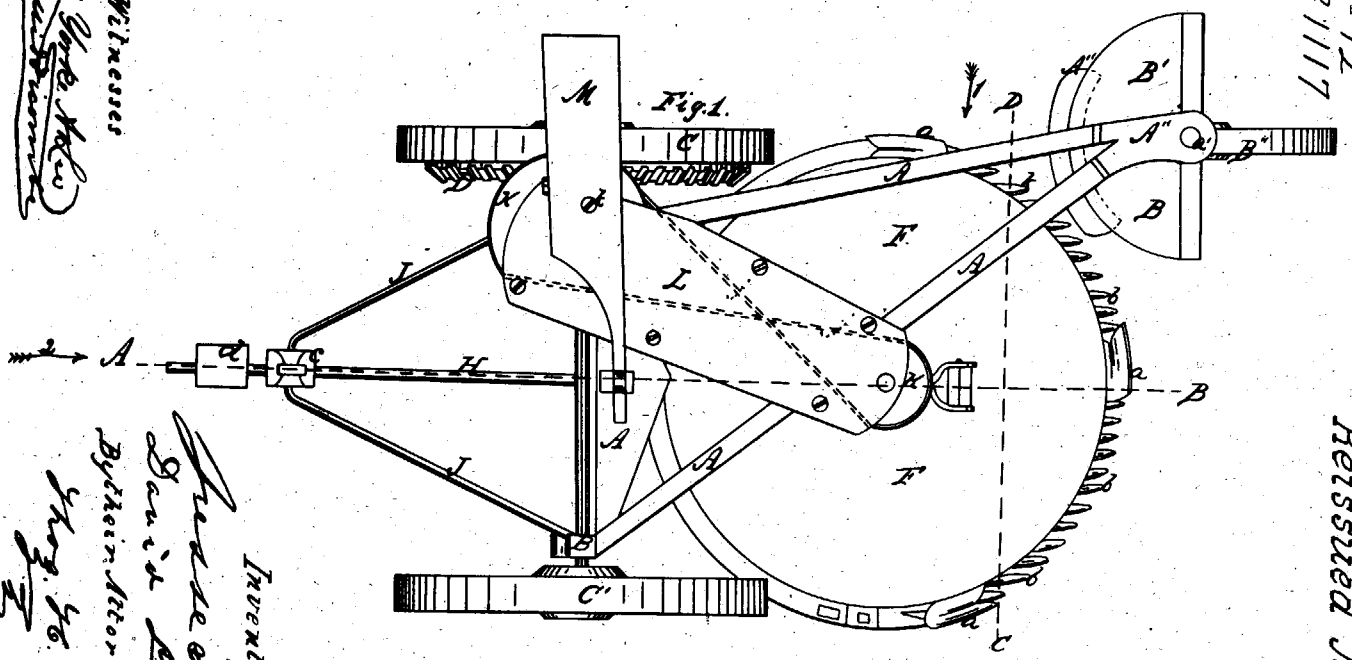
Inventors
Jesse S. Lake
David Lake
By their Attorney
Thos. H. Dodge
Witnesses
H. Yorke Allen
A. C. Wiemble 3 Sheets.
Sheet 2.
3 Sheets.
J. S & D. Lake.
Mower.
No 12
No 1117
Reissued Jan. 1, 1861.
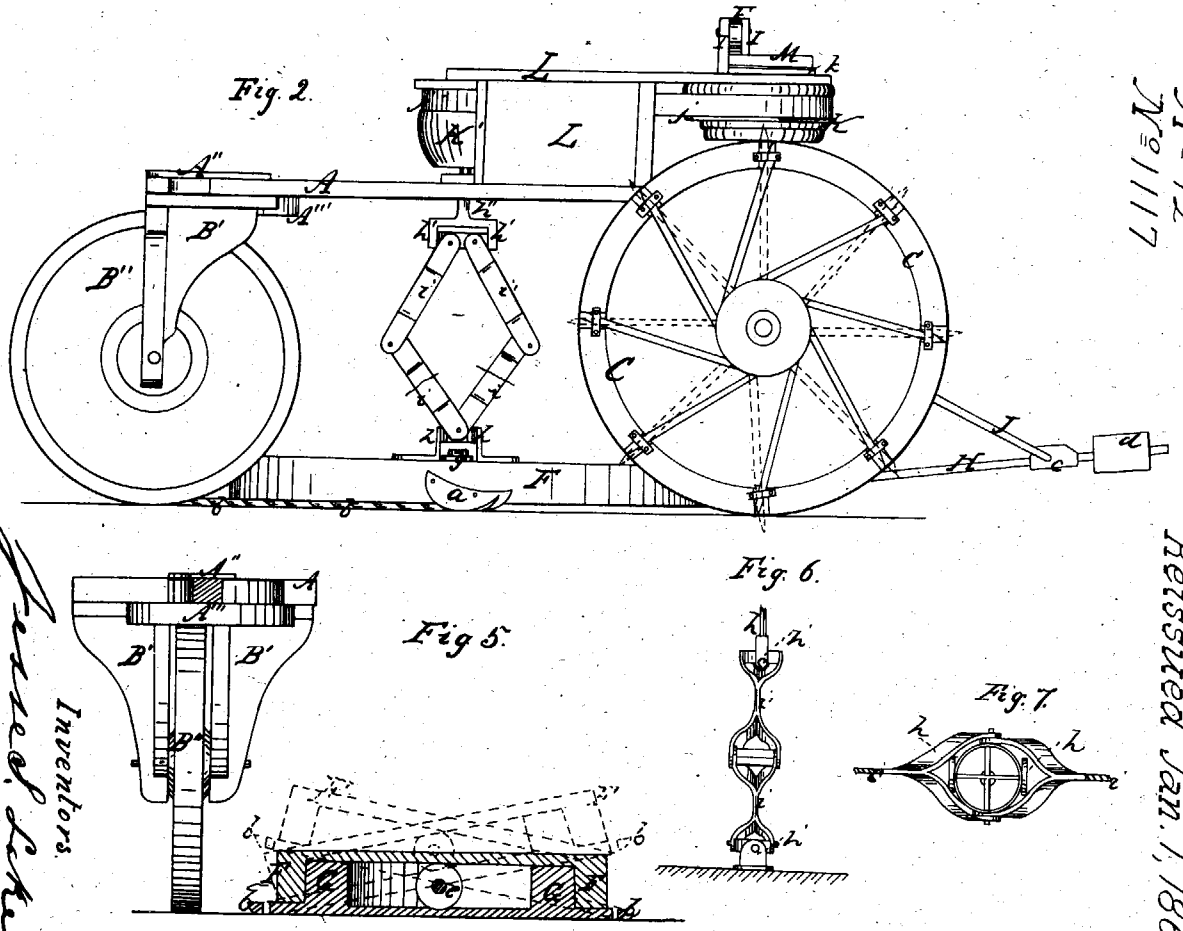
Witnesses
H. York Adee
A. C. Middlemore
Inventors.
Jesse S. Lake
David Lake
By their Attorney
Thos. H. Dodge 3 Sheets
Sheet 3.
3 Sheets.
J. S & D. Lake.
Mower.
No 12
No 1117
Reissued Jan. 1, 1861.
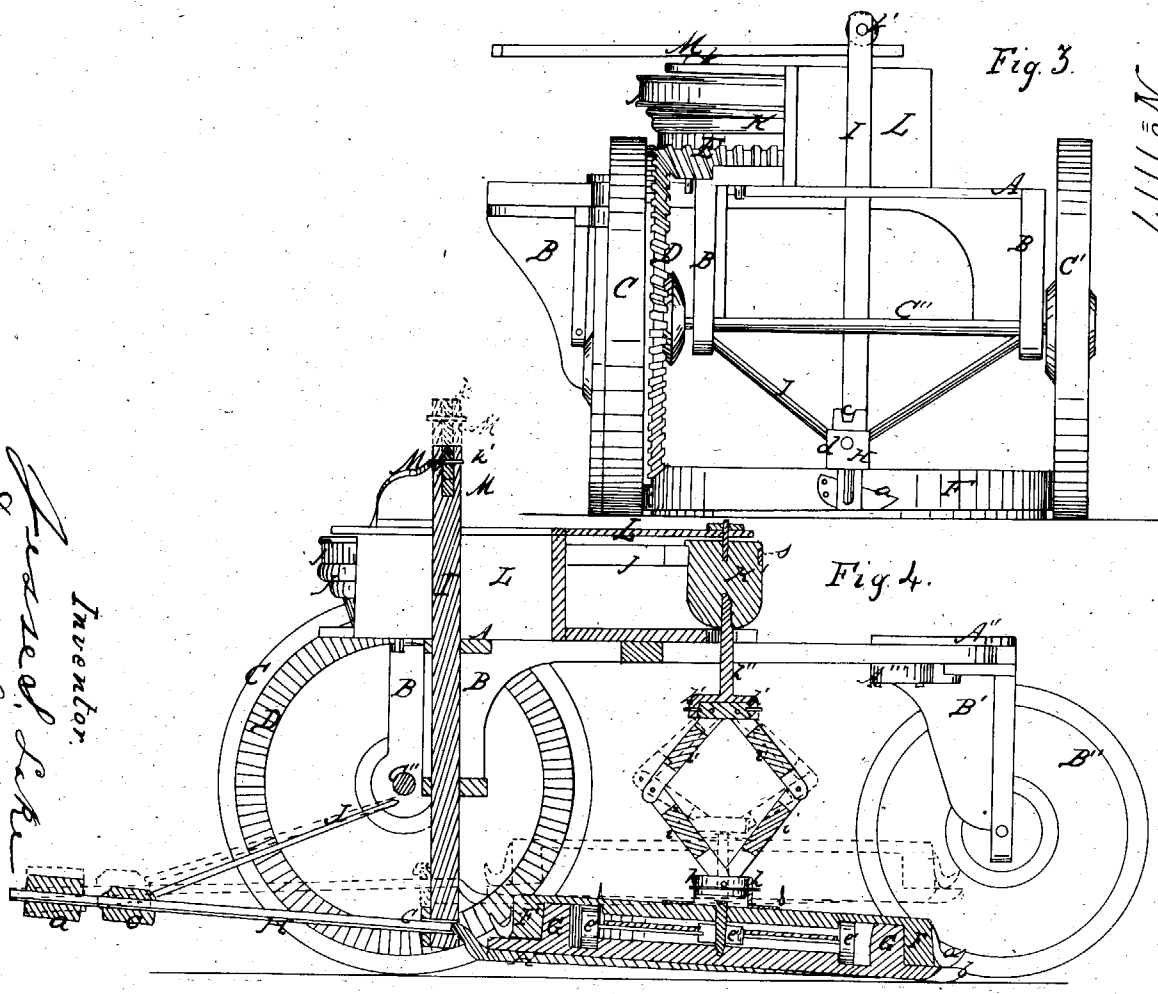
Inventor.
Jesse S. Lake
David Lake
By their Attorney
Thos. H. Dodge
Witnesses
H. Yorke Adee
Geo. Dracombe

UNITED STATES PATENT OFFICE.

JESSE S. LAKE AND DAVID LAKE, OF SMITH'S LANDING, NEW JERSEY, ASSIGNORS TO JAMES A. SAXTON.

IMPROVEMENT IN GRASS-HARVESTERS.

Specification forming part of Letters Patent No. 9,137, dated July 20, 1852; Reissue No. 1,117, dated January 1, 1861.

*To all whom it may concern:*

Be it known that we, JESSE S. LAKE and DAVID LAKE, both of Smith's Landing, in the county of Atlantic and State of New Jersey, have invented certain new and useful Improvements in Mowing-Machines or Grass-Harvesters; and we do hereby declare that the following is a full, clear, and exact description of the same, reference being had to the accompanying drawings, forming a part of this specification, and in which—

Figure 1 represents a plan view of a machine, showing one mode of applying our said improvements. Fig. 2 represents a side view of the machine as shown in Fig. 1, looking in the direction of arrow 1, the machine being represented as reversed or facing in an opposite direction from Fig. 1. Fig. 3 represents a portion of the frame, wheels, and cutting apparatus, looking in the direction of arrow 2, Fig. 1. Fig. 4 represents a longitudinal section on line A B, Fig. 1, the cutting apparatus being shown in two different positions—one in black lines and the other in red. Fig. 5 represents a cross-section on line C D, Fig. 1, looking in the direction of arrow 2, the parts G and F being shown in different positions in full and dotted red lines. Figs. 6 and 7 represent detached parts of the mechanism used to operate the cutting apparatus.

Whenever it may be expedient to use one or more of the several parts or branches of our improvements separate from the rest such part or parts may be used in connection with any suitable frame and gearing; and it is obvious that several parts of our improvements are applicable to various other mowing-machines in use.

That branch of our improvements which forms the subject of this patent will now be described; but all of the other parts of the machine represented in the drawings as the one to which they are in this instance applied will not be explained in detail, since they are fully set forth in other reissue patents to us of even date herewith, and of which this is one division.

In the drawings, A A A represent the main frame of the machine, having a front support from a swivel-frame, B′, which is pivoted to it at *a′*, and which turns under the front of frame A and over a lip or projection from the piece A‴, which is rigidly secured to the under side of frame A. The swivel-frame B′ has a wheel, B″. The rear of the main frame is supported by two wheels, C C′, whose journal or axle C″ turns in the lower ends of the pieces B B, which project down from frame A. The wheel C′ is loose on its shaft.

The finger-support platform G, or that part of the machine to which the guards or fingers *b* are attached, is recessed out on the bottom, so that the metallic connection or lever H can be fitted into such recess or socket, whereby the bottom of H and the bottom of that part which supports the guards or fingers will be flush, so that as they are moved over the ground by the part I there will be no catching of the parts.

The metallic connection or lever H is rigidly secured to the part G after it has been placed in the socket or recess, and is then curved up and passed loosely through a hole in the lower end of the coupling-piece I, which is free to slide up and down in a mortise in the part A′, which connects the lower ends of the pieces B B and a similar mortise in the rear of the frame A. A washer-piece, *c*, is placed on the part H, just in rear of the piece I, to keep the metallic connection or lever H in place when the machine is backed. The lever H then extends backward, passes loosely through a guide-piece, *c′*, and is provided with an adjustable weight, *d*, on its end. The guide-piece *c′* is jointed to a hinged brace, J, on each side, so that it can rise and fall in a vertical plane, its motion being in the arc of a circle of which the upper joints of the braces J is the center. The upper end of the coupling-piece I is connected to one end of a lever-seat, M, which is occupied by the driver when the machine is in operation, and whereby the lower end of I can be held up at any desired height from the ground. It will be seen that by moving the weight *d* back on lever H the finger-beam platform, or that part to which the guards or fingers which support the grass while it is being cut, can be made to bear with a very slight weight on the stubble or ground, thus avoiding a great amount of friction and side draft consequent to grass-cutting machines as heretofore constructed.

The part H is made of iron, and is curved up where it connects with the coupling to the main frame, so that it is not liable to be broken by the action of the machine, and at the same time its connection is such as to permit the finger-support to run close to the ground, so as to admit of the grass being cut close, and that, too, without being subject to catch and drag along cut grass at the point where it is connected to the main frame-coupling. This is a great advantage over previous grass-cutters.

The platform or finger support G is grooved out on its upper side, and provided with a friction device consisting of a ring, *e*, with loose radiating shafts, to the outer ends of which are fastened friction-wheels *e'*, upon which the cutter-frame F rests and revolves, the friction device being free to run around in the groove in G.

The cutters *a* are attached to the edge of F, as shown in the drawings, so as to run close to the tops of the fingers *b* to sever the grass as the machine advances. The cutter-frame revolves around a pivot, *g*, fast in the part G, and receives its rotary motion from gear D on the main drive-wheel C, taking into gear E, connected to pulley K, from which passes a cross-band, *j*, to pulley K', to the lower end of whose shaft are attached ears *h' h'*, between which is pivoted a ring, to which are pivoted the upper forked ends of two sets of levers, *i i'*, whose lower forked ends are pivoted or hinged to the upper forked ends of levers *i i*, whose lower forked ends are in turn pivoted or hinged to a ring or swivel-piece pivoted between ears *h h*, made fast to the top of the frame F. It will thus be seen that, although the front of the fingers can rise and fall to pass over slight elevations, (the hinged connection of H and I being quite loose,) or the finger-support rock, roll, or wabble laterally, as shown in full red and dotted lines in Fig. 5, or the entire part G be raised bodily, the cutter will continue to operate, since the double-jointed levers, in combination with their ring or swiveled connections with ears *h h* and *h' h'*, permit the frame F, to which the cutters *a* are attached, to conform freely to the up-and-down and swaying motions of the part to which the fingers *b* are attached.

Again, it will be observed that our finger-support has but a single draft-connection, and yet it is free to rise above and fall below the plane on which the carrying-wheels are passing. This is a great advantage over grass-harvesters as previously constructed, since it enables the machine to be used on uneven ground, that part of the machine to which the guards or fingers are attached being free to conform to the inequalities of the ground independent of the up and down motions of the carrying or driving wheels.

Having described one practical way in which that part of our invention which forms the subject of this patent can be carried out, what we claim, and desire to secure by Letters Patent, is—

1. The combination of the coupling-piece I and finger-support G with an intermediate metallic connection or lever, H, for the purposes stated.

2. The metallic connection or lever H, both as a hinge and a support to the cutting apparatus and finger-support.

3. The combination of the finger-support and the metallic connection or lever H in such a manner that their lower surfaces shall be flush, for the purposes set forth.

4. In combination with the main frame of a grass-harvester, a finger or guard support, whatever it may be called, having two independently-acting hinges or yielding connections interposed between it and the main frame in such a manner as that said finger or guard support as it is advanced by means of its hinges or yielding connections shall be free to rise above or fall below the plane on which the carrying or driving wheel or wheels are passing.

5. So hinging that part of a mowing-machine to which the guards or fingers are attached as that it may oscillate or turn on a line at right angles to the line of motion of the machine for the purpose of raising the points of the guards to adapt the cutting apparatus to the condition of the ground, while it is also free to roll, rock, or wabble on a line parallel to the line of motion of the machine.

6. The combination, with the main frame, finger-support, and cutting apparatus of a mowing-machine, of a lever with an adjustable weight thereon, whereby the pressure of the finger-support and cutting apparatus upon the ground can be regulated by simply moving said weight upon its lever.

7. The combination of a counterpoise-weight or the equivalent thereof with that part of a mowing-machine, whatever it may be called, to which the guard-fingers are attached to diminish its pressure upon the ground, and thus obviate side draft and friction.

In witness whereof we have hereunto subscribed our names.

JESSE S. LAKE.
DAVID LAKE.

In presence of—
JOHN T. LAKE,
HENRY W. ROBINSON.